(12) United States Patent
Liu et al.

(10) Patent No.: US 10,824,477 B2
(45) Date of Patent: Nov. 3, 2020

(54) NETWORK FUNCTION VIRTUALIZATION SERVICE CONTAINER CREATION

(71) Applicant: Huawei Technologies Co., Ltd., Shenzhen (CN)

(72) Inventors: Tao Liu, Shenzhen (CN); Hai Xia, Shenzhen (CN); Chaocai Zhang, Shenzhen (CN)

(73) Assignee: HUAWEI TECHNOLOGIES CO., LTD., Shenzhen ( * ) Notice: Subject to any disclaimer, the term of this patent is extended or adjusted under 35 U.S.C. 154(b) by 71 days.

(21) Appl. No.: 16/116,330

(22) Filed: Aug. 29, 2018

(65) Prior Publication Data

US 2018/0365076 A1 Dec. 20, 2018

Related U.S. Application Data

(63) Continuation of application No. PCT/CN2017/072900, filed on Feb. 4, 2017.

(30) Foreign Application Priority Data

Feb. 29, 2016 (CN) .......................... 2016 1 0111216

(51) Int. Cl.
*G06F 13/00* (2006.01)
*G06F 9/50* (2006.01)
(Continued)

(52) U.S. Cl.
CPC ........ *G06F 9/5077* (2013.01); *G06F 9/45558* (2013.01); *G06F 9/4825* (2013.01);
(Continued)

(58) Field of Classification Search
CPC . G06F 9/50; G06F 9/455; G06F 9/547; G06F 9/4825; G06F 9/5077;
(Continued)

(56) References Cited

U.S. PATENT DOCUMENTS

2012/0174098 A1 7/2012 Tanikawa et al.
2012/0254437 A1 10/2012 Hirschfeld et al.
(Continued)

FOREIGN PATENT DOCUMENTS

CN 104050045 A 9/2014
CN 104601592 A 5/2015
(Continued)

OTHER PUBLICATIONS

Foreign Communication From A Counterpart Application, European Application No. 17759090.8, Extended European Search Report dated Feb. 12, 2019, 8 pages.
(Continued)

*Primary Examiner* — Robert B Harrell
(74) *Attorney, Agent, or Firm* — Conley Rose, P.C.

(57) ABSTRACT

A service container creation method and apparatus, where the method includes receiving, by a virtualization layer in a network functions virtualization (NFV) infrastructure (NFVI), a container creation message from a virtualized infrastructure manager (VIM) for a target service, creating, by the virtualization layer, a service container in the NFVI, deploying the target service in the service container, according to the container creation message, and establishing, by the virtualization layer according to a timer type in the container creation message, a binding relationship between the service container and one or more central processing units (CPUs) in the NFVI. Hence, isolate performance impact posed by a high-precision timer in an NFV system within a range of a single service container such that the NFV system considers performance of each service container while ensuring flexible service deployment.

20 Claims, 7 Drawing Sheets

(51) Int. Cl.
*G06F 9/48* (2006.01)
*G06F 9/54* (2006.01)
*G06F 9/455* (2018.01)
*H04L 29/08* (2006.01)
*H04L 12/24* (2006.01)

(52) U.S. Cl.
CPC .............. *G06F 9/547* (2013.01); *H04L 67/16* (2013.01); *H04L 67/34* (2013.01); *G06F 2009/45562* (2013.01); *G06F 2009/45583* (2013.01); *H04L 41/5041* (2013.01); *H04L 67/10* (2013.01)

(58) Field of Classification Search
CPC ................. G06F 9/45558; G06F 13/00; G06F 2009/45562; G06F 2009/45583; H04L 12/24; H04L 12/5695; H04L 29/06; H04L 29/08; H04L 29/08072; H04L 29/08144; H04L 29/08171; H04L 41/5041; H04L 67/10; H04L 67/16; H04L 67/34
USPC ........................................................ 709/226
See application file for complete search history.

(56) References Cited

U.S. PATENT DOCUMENTS

| | | | |
|---|---|---|---|
| 2014/0201374 | A1 | 7/2014 | Ashwood-Smith et al. |
| 2014/0372786 | A1 | 12/2014 | Wohlgemuth et al. |
| 2016/0321112 | A1* | 11/2016 | Iwashina ................. H04L 47/78 |
| 2016/0328258 | A1* | 11/2016 | Iwashina ................. H04L 47/70 |
| 2016/0335111 | A1* | 11/2016 | Bruun ................. G06F 9/45558 |
| 2017/0075732 | A1 | 3/2017 | Itoh et al. |
| 2017/0094377 | A1* | 3/2017 | Herdrich ................. H04L 43/10 |
| 2017/0104679 | A1* | 4/2017 | Sunavala ............ G06F 9/45558 |
| 2017/0177396 | A1* | 6/2017 | Palermo ............. G06F 9/45558 |
| 2017/0331862 | A1 | 11/2017 | Wang et al. |
| 2018/0081714 | A1 | 3/2018 | Liu |

FOREIGN PATENT DOCUMENTS

| | | |
|---|---|---|
| CN | 104869023 A | 8/2015 |
| CN | 105119736 A | 12/2015 |
| CN | 105247826 A | 1/2016 |
| CN | 105700961 A | 6/2016 |
| CN | 105103125 B | 12/2017 |
| CN | 105103507 B | 1/2018 |
| WO | 2012113007 A1 | 8/2012 |
| WO | 2015133125 A1 | 9/2015 |

OTHER PUBLICATIONS

Machine Translation and Abstract of Chinese Publication No. CN104050045, Sep. 17, 2014, 42 pages.
Machine Translation and Abstract of Chinese Publication No. CN105103125, Nov. 25, 2015, 30 pages.
Machine Translation and Abstract of Chinese Publication No. CN105103507, Nov. 25, 2015, 27 pages.
Machine Translation and Abstract of Chinese Publication No. CN105119736, Dec. 2, 2015, 28 pages.
Machine Translation and Abstract of Chinese Publication No. CN105700961, Jun. 22, 2016, 28 pages.
"Network Functions Virtualisation (NFV); Architectural Framework," ETSI GS NFV 002, V1.1.1, Oct. 2013, 21 pages.
"Network Functions Virtualisation (NFV); Architectural Framework," ETSI GS NFV 002, V1.2.1, Dec. 2014, 21 pages.
Foreign Communication From a Counterpart Application, Chinese Application No. 201610111216.4, Chinese Office Action dated Jul. 3, 2018, 5 pages.
Foreign Communication From a Counterpart Application, PCT Application No. PCT/CN2017/072900, English Translation of International Search Report dated Apr. 27, 2017, 2 pages.
Foreign Communication From a Counterpart Application, PCT Application No. PCT/CN2017/072900, English Translation of Written Opinion dated Apr. 27, 2017, 7 pages.

* cited by examiner

NETWORK FUNCTION VIRTUALIZATION SERVICE CONTAINER CREATION

CROSS-REFERENCE TO RELATED APPLICATIONS

This application is a continuation of International Patent Application No. PCT/CN2017/072900 filed on Feb. 4, 2017, which claims priority to Chinese Patent Application No. 201610111216.4 filed on Feb. 29, 2016. The disclosures of the aforementioned applications are hereby incorporated by reference in their entireties.

TECHNICAL FIELD

The present disclosure relates to the field of container technologies in a network functions virtualization (NFV) system, and in particular, to a service container creation method and apparatus.

BACKGROUND

Currently, with rapid development of container technologies, consideration of introduction of container technologies into an NFV system for service deployment has been proposed. A virtual network function (VNF) can be deployed in a service container, and a service container may be deployed in a physical machine, or may be deployed in a virtual machine. However, regardless of specific deployment, service containers deployed on a same node (a virtual machine or a physical machine) share a same operating system kernel. To keep the service containers deployed on the node running in order, the operating system kernel needs to use a timer. Using a timer further includes a process of creating a timer queue and adding a timer.

FIG. 1 is a schematic flowchart of creating a timer queue when a current operating system kernel is used. After the operating system kernel is used, whether to use a high-precision timer or a common-precision timer is determined according to an operating system kernel enabling parameter, a corresponding queue is created, and a timer subsequently added is added into the queue.

FIG. 2 is a schematic flowchart of adding a timer into a current operating system kernel. A use source of a timer includes a user process timer task and an operating system kernel timer task. Regardless of the use source, when adding a timer, the system eventually invokes an interface of a kernel timer module to add the timer, and adds the timer into a corresponding queue. The queue is the timer queue created in FIG. 1, and there is only one type of a queue. For a high-precision timer queue, all timers are arranged according to a timer expiration time using a red-black tree algorithm, and their time precision may reach nanosecond (ns) scale according to a hardware clock capability. For a common-precision timer queue, all timers are arranged according to a timer expiration time using a timing wheel algorithm, and their time precision is generally at a millisecond (ms) scale (which is related to a kernel configuration, and is usually 4 ms for a server). Regardless of a quantity of timers, a clock interrupt generation frequency is constant (which is generally 250 times per second currently).

At present, different telecommunication services pose different application requirements on a kernel. For example, to reduce a forwarding delay, a high-precision timer in a kernel is used for a media service and a forwarding service. In contrast, only a common-precision timer is required for most core network call control services (such as a calling service and a billing service). For the foregoing application requirements, two solutions are mainly used in the other approaches.

In one solution, maintaining flexible service deployment is considered, and operating system kernels on all nodes in a system each use a high-precision timer, that is, a media service container and a forwarding service container (which require a high-precision timer), and another call control service container (a service container that requires only a common-precision timer) are all deployed on a same node. As shown in FIG. 3, FIG. 3 is a schematic diagram of a case in which multiple types of service containers are deployed on a same node (or kernel) and a high-precision timer is used. A high-precision timer is used on a node 1, a node 2, and a node 3, and a type of a service container deployed on each node is not limited. For example, a forwarding service and a media service are deployed on the node 1, a forwarding service and a calling service are deployed on the node 2, and a calling service is deployed on the node 3.

In the other solution, optimal service performance is considered, and an affinity deployment solution is used. Two types of services are separately deployed on different nodes in a centralized manner by means of cooperation between components in an NFV system such as a VNF manager (VNFM) or a virtualized infrastructure manager (VIM). A node is used as an isolation granularity to reduce interference in a common-precision service from a high-precision timer. That is, all nodes are classified into two types. On one type of nodes, a high-precision timer is used to dedicatedly deploy a forwarding service container and a media service container. On the other type of nodes, a high-precision timer is not used to dedicatedly deploy a call control service container. Therefore, separate scheduling and service container deployment for two types of node resources are implemented. As shown in FIG. 4, FIG. 4 is a schematic diagram of a case in which different types of service containers are deployed using two types of nodes. On a node 1 and a node 2, a high-precision timer is used, and only a service container that requires a high-precision timer can be deployed on the node 1 and the node 2. On a node 3 and a node 4, a common-precision timer function is used, and only a service container that requires a common-precision timer can be deployed on the node 3 and the node 4.

It is found that in a process of research that, in the former solution of the foregoing other approaches technical solutions, in a schematic diagram of a clock interrupt shown in FIG. 5, a quantity of clock interrupts on a node on which a high-precision timer is used is far greater than a quantity of clock interrupts on a node on which a common-precision timer is used. Therefore, although more clock interrupts can ensure precision of each timer, more clock interrupts result in performance overheads. Therefore, in this service container deployment solution, different types of service containers are deployed on a same node, and consequently, performance of a service container (such as a calling service container or a billing service container) that does not need to use a high-precision timer is reduced due to impact of the high-precision timer. In the latter solution, because a system can schedule various services only in a matched resource pool, if resources are insufficient, the resource pool needs to be adjusted. This limits flexibility in deploying different services.

SUMMARY

This application provides a service container creation method and apparatus in order help isolate performance impact posed by a high-precision timer in an NFV system within a range of a single service container, without affecting performance of another service container on a same node. In this way, the NFV system considers performance of each service container while ensuring flexible service deployment.

According to a first aspect, an embodiment of this application provides a service container creation method, including receiving, by a virtualization layer in an NFV infrastructure (NFVI), a container creation message sent by a VIM for a target service, where the container creation message includes a timer type of a timer that needs to be used for the target service, creating, by the virtualization layer, a service container in the NFVI, and deploying the target service in the service container, according to the container creation message, and establishing, by the virtualization layer, a binding relationship between the service container and one or more central processing units (CPUs) in the NFVI according to the timer type in the container creation message, where the one or more CPUs each correspond to a timer queue, the timer queue is used to add the timer for the target service, and a timer type in the timer queue is the same as the timer type in the container creation message.

It may be learned that the virtualization layer creates the service container based on the container creation message and establishes a binding relationship between the service container and a CPU resource in an NFV system such that the timer for the service in the service container can be added into a timer queue corresponding to a CPU. Timer queues corresponding to CPUs are isolated from each other, that is, one CPU corresponds to one timer queue. A timer for a service such as a media service that requires a high-precision timer is added into a timer queue of a high-precision timer type, and a timer for a service such as a calling service that requires a common-precision timer is added into a timer queue of a common-precision timer type. Therefore, in this embodiment of the present disclosure, performance impact posed by a high-precision timer in the NFV system is isolated within a range of a single service container, without affecting performance of another service container such that the NFV system considers performance of each service container while ensuring flexible service deployment.

With reference to the first aspect, in some possible implementations, the container creation message received by the virtualization layer includes different timer types that need to be used for multiple target services, the virtualization layer creates different service containers, and target services using a same timer type are deployed in each service container.

The multiple target services include a media service and a forwarding service.

The timer type includes a high-precision timer type and a common-precision timer type.

With reference to the first aspect, in some possible implementations, the virtualization layer is further configured to perform the following operation of receiving, by the virtualization layer, a timer task request of the target service, and adding the timer for the target service into a timer queue corresponding to a CPU that processes the target service.

It may be learned that the timer for the target service that is added by the foregoing virtualization layer into the timer queue uses a CPU as an isolation granularity in order to isolate a clock interrupt of a CPU corresponding to a high-precision timer queue from a clock interrupt of a CPU corresponding to a common-precision timer queue. A created service container is bound to a CPU, that is, different service containers are bound to different CPUs. Therefore, clock interrupts of service containers are isolated from each other such that the NFV system considers performance of each service container while ensuring flexible service deployment.

With reference to the first aspect, in some possible implementations, the container creation message is generated when an NFV manager (NFVM) parses a service deployment descriptor and is sent to the VIM after an NFV orchestrator (NFVO) of an NFV orchestration and management system (NFVMANO) generates the service deployment descriptor based on obtained requirement information of the target service and sends the service deployment descriptor to the NFVM.

With reference to the first aspect, in some possible implementations, before receiving, by a virtualization layer in an NFVI, a container creation message sent by a VIM for a target service, the virtualization layer is further configured to perform the following operation of creating, by the virtualization layer using a preset timer enabling component, a high-precision timer queue corresponding to a CPU that uses a high-precision timer, and a common-precision timer queue corresponding to a CPU that uses a common-precision timer.

It may be learned that the virtualization layer creates both the high-precision timer queue and the common-precision timer queue using the preset timer enabling component, establishes in advance an association relationship between a CPU resource and a timer queue in the NFV system. Therefore, when dynamically creating a service container based on a service requirement, the virtualization layer can allocate, to the created service container in real time, a CPU resource to which the created service container needs to be bound in order to help improve realtimeness in service container deployment.

With reference to the first aspect, in some possible implementations, the container creation message may further include a CPU resource use mode, and the CPU resource use mode is used to indicate a CPU resource use mode of a service container, and further includes two modes, exclusive occupation of a CPU resource and sharing of a CPU resource.

If the CPU resource use mode in the container creation message is exclusive occupation of a CPU resource, a CPU to which the service container created by the virtualization layer is bound can be occupied only by the service container, that is, only a timer for the target service in the service container can be added into a timer queue corresponding to the bound CPU, and a timer for a service in another service container except the service container cannot be added into the timer queue corresponding to the bound CPU.

If the CPU resource use mode in the container creation message is sharing of a CPU resource, multiple service containers of a same type that are created by the virtualization layer can share a corresponding CPU, that is, timers for services in the multiple service containers of the same type can be added into a timer queue corresponding to one CPU. This may further avoid a waste occurring when a CPU resource bound to a service container with less traffic is deployed in the mode of exclusive occupation of a CPU resource, and helps use a CPU resource more properly.

With reference to the first aspect, in some possible implementations, the CPU resource use mode in the container creation message is sharing of a CPU resource, the NFVI includes a first CPU group including CPUs that use a high-precision timer and a second CPU group including CPUs that use a common-precision timer, and after establishing the binding relationship between the service container and the one or more central processing units CPUs in the NFVI, the virtualization layer is further configured to perform the following operation of adjusting, by the virtualization layer, a timer type used by at least one CPU in a CPU group with less CPU usage of the first CPU group and the second CPU group if the virtualization layer detects that a difference between first CPU usage of the first CPU group and second CPU usage of the second CPU group is greater than or equal to a preset threshold.

It may be learned that the virtualization layer in this embodiment of the present disclosure can flexibly adjust a CPU resource based on an actual deployment status of a service container in order to help improve CPU resource usage of the NFV system.

According to a second aspect, an embodiment of this application provides a service container creation apparatus, used in a virtualization layer in an NFVI, including a message receiving unit configured to receive a container creation message sent by a VIM for a target service, where the container creation message includes a timer type of a timer that needs to be used for the target service, a container creation unit configured to create a target service container in the NFVI, and deploy the target service in the service container, according to the container creation message, and a relationship establishment unit configured to establish a binding relationship between the service container and one or more CPUs in the NFVI according to the timer type in the container creation message, where the one or more CPUs each correspond to a timer queue, the timer queue is used to add the timer for the target service, and a timer type in the timer queue matches or is the same as the timer type in the container creation message.

With reference to the second aspect, in some possible implementations, the container creation message received by the virtualization layer includes different timer types that need to be used for multiple target services, the virtualization layer creates different service containers, and target services using a same timer type are deployed in each service container.

With reference to the second aspect, in some possible implementations, the multiple target services include a media service and a forwarding service.

With reference to the second aspect, in some possible implementations, the timer type includes a high-precision timer type and a common-precision timer type.

With reference to the second aspect, in some possible implementations, the apparatus further includes an addition unit configured to receive a timer task request of the target service, and add the timer for the target service into a timer queue corresponding to a CPU that processes the target service.

With reference to the second aspect, in some possible implementations, the container creation message is generated when an NFVM parses a service deployment descriptor and is sent to the VIM after an NFVO of an NFVMANO generates the service deployment descriptor based on obtained requirement information of the target service and sends the service deployment descriptor to the NFVM.

With reference to the second aspect, in some possible implementations, the apparatus further includes a queue creation unit configured to, before the message receiving unit receives the container creation message sent by the VIM for the target service, create, using a preset timer enabling component, a high-precision timer queue corresponding to a CPU that uses a high-precision timer, and a common-precision timer queue corresponding to a CPU that uses a common-precision timer.

According to a third aspect, an embodiment of this application provides a service container creation apparatus, including a memory that stores executable program code, and a processor coupled to the memory, where the processor invokes the executable program code stored in the memory to perform some or all of the steps according to any method in the first aspect of the embodiments of the present disclosure.

According to a fourth aspect, an embodiment of this application provides a computer readable storage medium, where the computer readable storage medium stores program code executed by a computer device, the program code further includes an execution instruction, and the execution instruction is used to execute some or all of the steps according to any method in the first aspect of the embodiments of the present disclosure.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

To better understand the technical solutions of the present disclosure, the following first briefly describes a system architecture of an NFV system.

Figure 1:
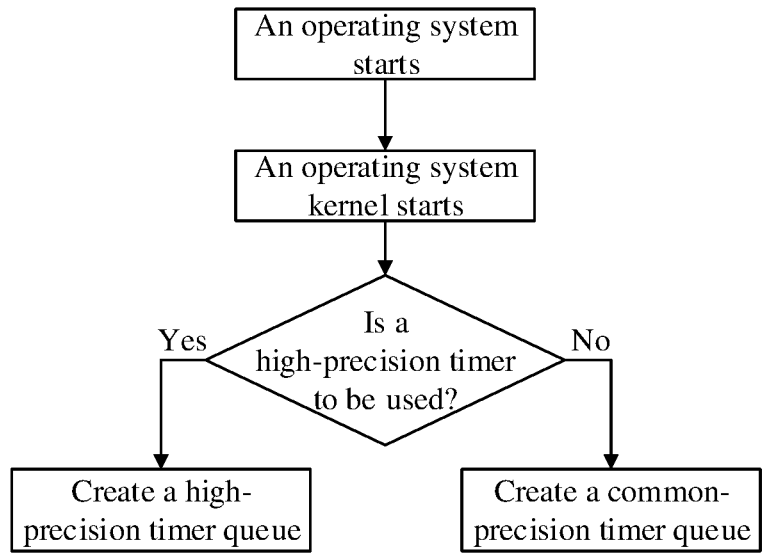
FIG. 1 is a schematic flowchart of creating a timer queue when an operating system kernel is used.
Figure 2:
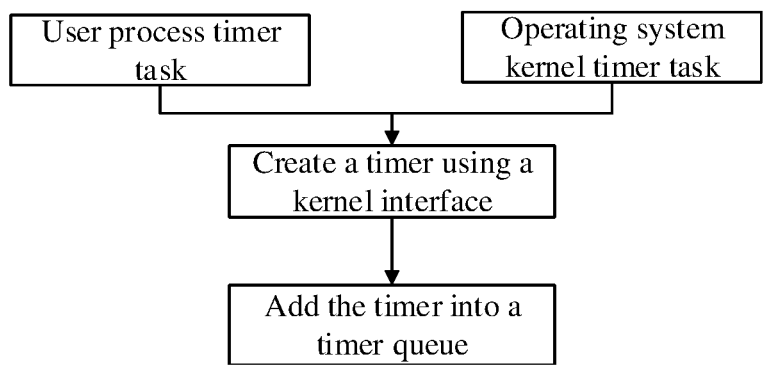
FIG. 2 is a schematic flowchart of adding a timer into an operating system kernel.
Figure 3:
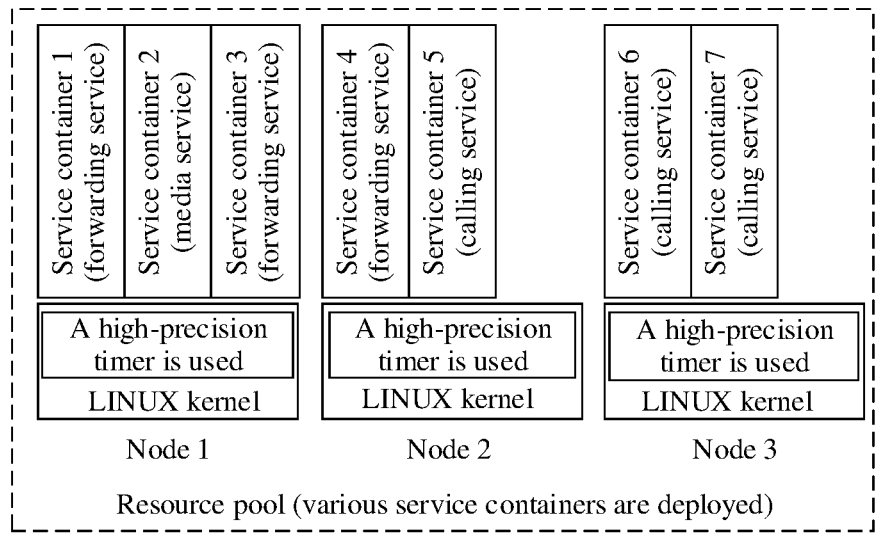
FIG. 3 is a schematic diagram of a case in which multiple types of service containers are deployed on a same node (or kernel) and a high-precision timer is used.
Figure 4:
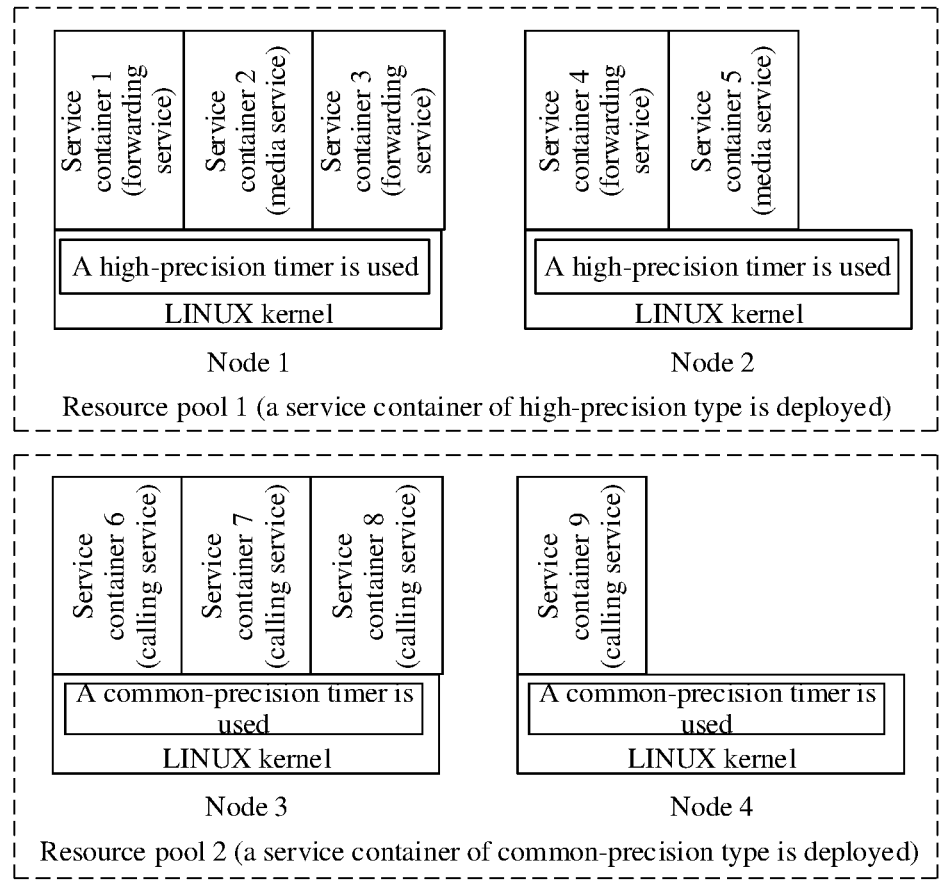
FIG. 4 is a schematic diagram of a case in which different types of service containers are deployed using two types of nodes.
Figure 5:
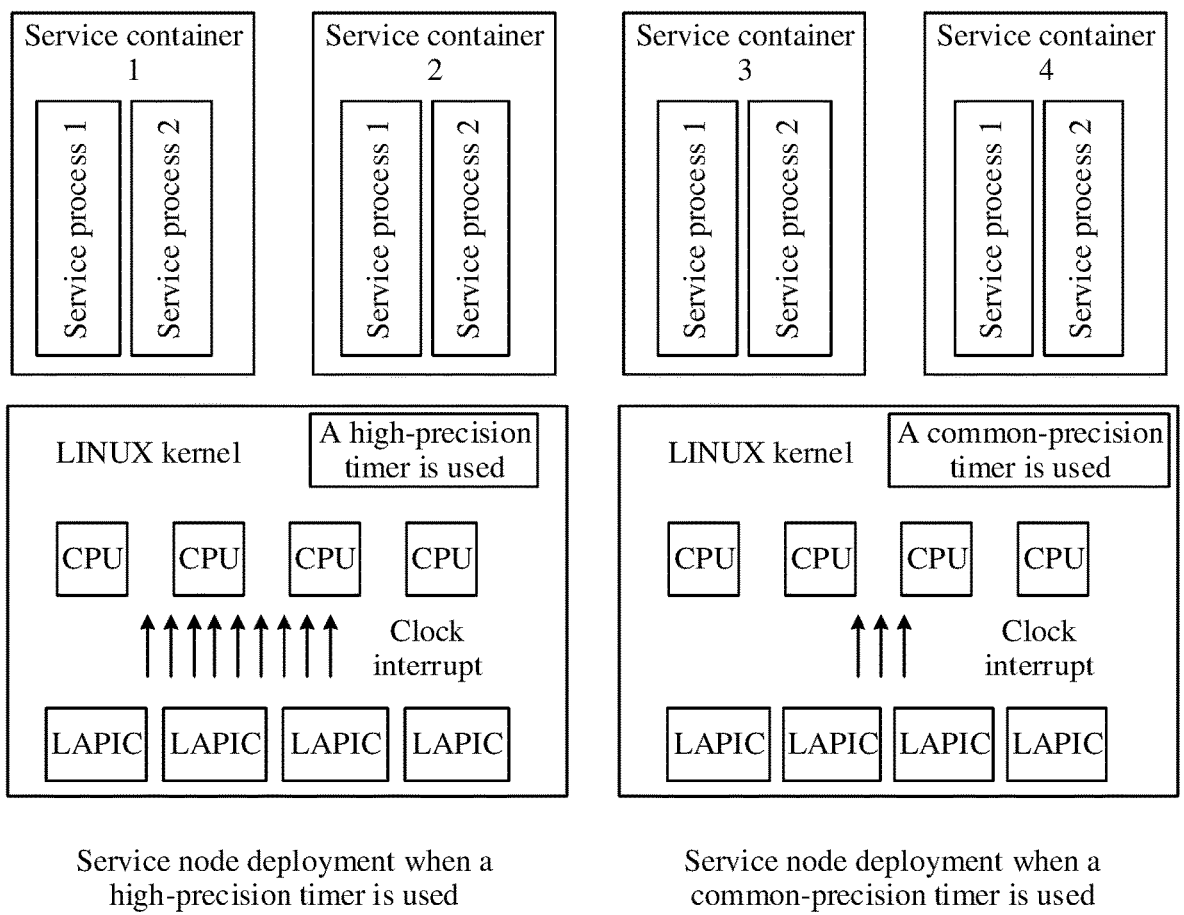
FIG. 5 is a schematic diagram of a clock interrupt of a CPU resource in an NFV system.
Figure 6:
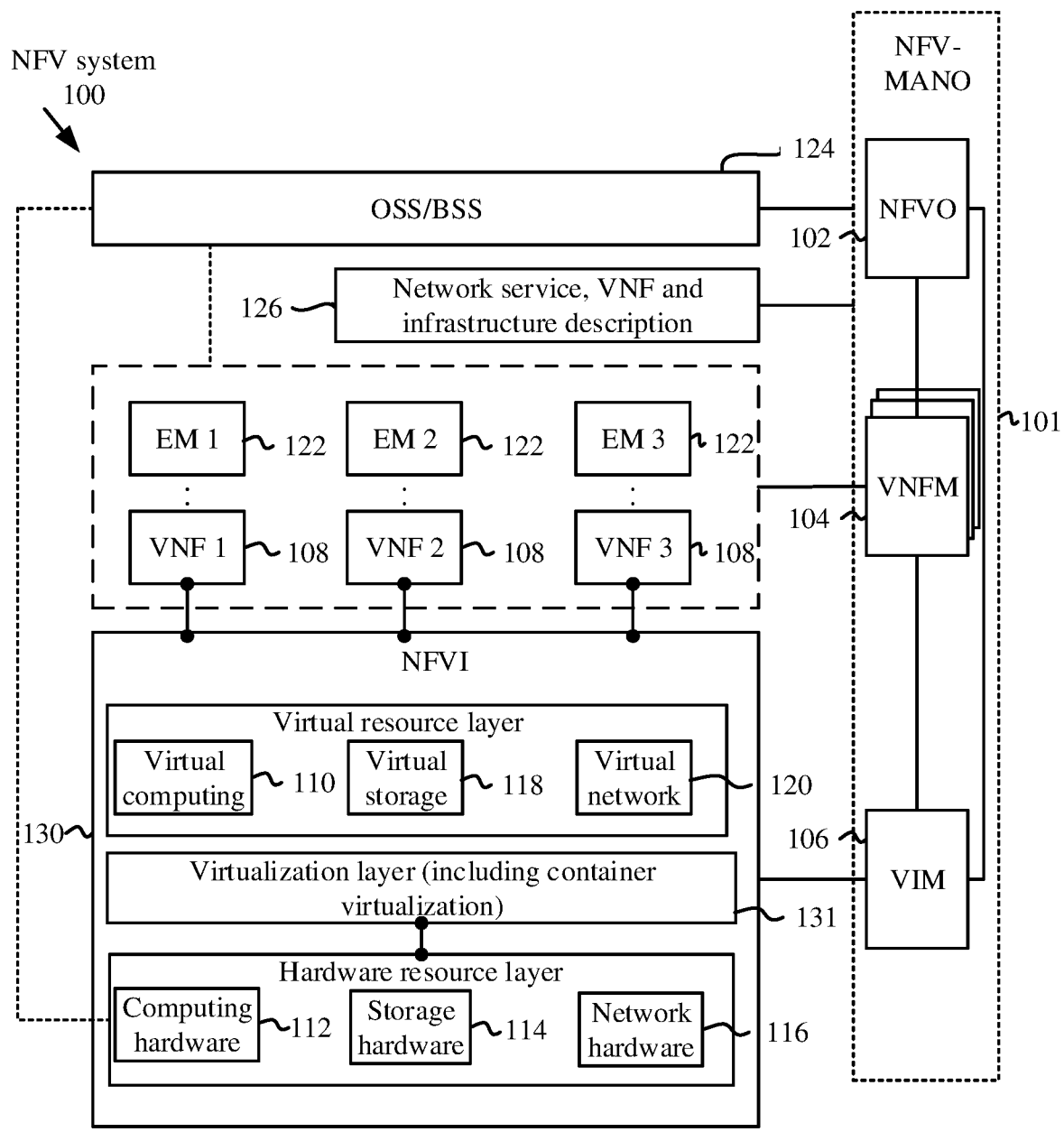
FIG. 6 is a system architecture diagram of an NFV system according to an embodiment of the present disclosure.

Referring to FIG. 6, FIG. 6 is a system architecture diagram of an NFV system 100 according to an embodiment of the present disclosure. The NFV system 100 includes an NFVMANO 101, an NFVI 130, multiple VNFs 108, multiple element managements (EM) 122, a network service, VNF and infrastructure description 126, and an Operation-Support System (OSS)/Business Support System (BSS) 124.

The NFVMANO 101 includes an NFVO 102, one or more VNFMs 104, and a VIM 106.

The NFVI 130 includes a hardware resource layer, a virtualization layer 131, and a virtual resource layer. The hardware resource layer includes computing hardware 112, storage hardware 114, and network hardware 116, and the virtualization resource layer includes virtual computing 110, virtual storage 118, and a virtual network 120.

The network service, VNF and infrastructure description 126 and the OSS/BSS 124 are further described in an Europe telecommunications Standards Institute (ETSI) Group Specification (GS) NFV 002 V1.1.1 standard.

The NFVI 130 includes a hardware resource, a software resource, or a combination of the two, and is configured to complete deployment of a virtualized environment. The hardware resource and the virtualization layer 131 are used to provide virtualized resources, for example, used as a virtual machine or a virtual container in another form to serve as the VNFs 108.

The hardware resource includes the computing hardware 112, the storage hardware 114, and the network hardware 116. The computing hardware 112 may be, for example, market-available hardware and/or user-customized hardware, and is used to provide processing and computing resources. The storage hardware 114 may be, for example, storage capacity provided in the network or storage capacity residing on the storage hardware 114 itself (a local memory in a server). In an implementation solution, resources of the computing hardware 112 and storage hardware 114 can be concentrated together. The network hardware 116 may be, for example, a switch, a router, and/or any another network device configured to have a switching function. The network hardware 116 may span multiple domains and may include multiple networks interconnected to one or more transmission networks.

The virtualization layer 131 includes multiple virtualization technologies, and further includes a virtual machine virtualization technology and a container virtualization technology. The virtual machine virtualization technology and the container virtualization technology may abstract a resource and decouple the VNFs 108 in order to provide a virtualized resource for the VNFs 108. The virtual computing 110 and the virtual storage 118 may be provided for the VNFs 108 in a form of a virtual machine or another virtual container. For example, one or more VNFs 108 may be deployed on a virtual machine, or may be deployed in a container.

Detailed description is made below.

Figure 7A:
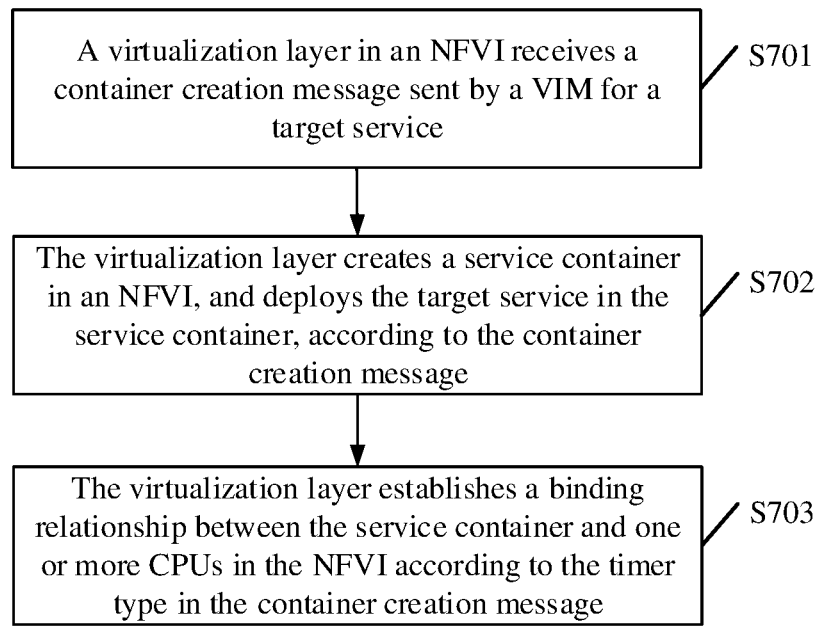
FIG. 7A is a schematic flowchart of a service container creation method according to an embodiment of the present disclosure.

Referring to FIG. 7A, FIG. 7A is a schematic flowchart of a service container creation method according to an embodiment of the present disclosure. As shown in the figure, the method includes the following steps.

Step S701. A virtualization layer in an NFVI receives a container creation message sent by a VIM for a target service, where the container creation message includes a timer type of a timer that needs to be used for the target service.

In specific implementation, the virtualization layer may receive, using an Nf-Vi interface, a container creation message sent by a VIM in an NFV system for the target service. A timer type in the container creation message further includes a high-precision timer type and a common-precision timer type.

The container creation message is generated when an NFVMANO in the NFV system processes requirement information of the target service after obtaining the requirement information of the target service. In specific implementation, that the NFVMANO processes the requirement information of the target service further includes the following steps.

An NFVO in the NFVMANO generates a service deployment descriptor based on obtained requirement information of at least one target service, and sends the service deployment descriptor to a VNFM using an Or-Vnfm interface. The service deployment descriptor may include service container type description information and a timer type that needs to be used for a service container. The service container type description information includes a manner of allocating resources such as a CPU, a hard disk, and a network.

In specific implementation, an existing Or-Vnfm interface in the NFV system may extend the following fields to describe a type of a to-be-created service container and a timer type of a timer that needs to be used:

| Field name | Type | Function |
| --- | --- | --- |
| Service container type | Enumeration | Identify a type of a service container |
| Timer type | Enumeration | Indicate whether the service container uses a high-precision timer or a common-precision timer |

The VNFM parses the service deployment descriptor, obtains a service container that needs to be deployed and a timer type that needs to be used for the service container, generates the container creation message, and sends the container creation message to the VIM using a Vi-Vnfm interface.

In specific implementation, an existing Vi-Vnfm interface in the NFV system may extend the following fields to describe a timer type of a timer that needs to be used for a service container:

| Field name | Type | Function |
| --- | --- | --- |
| Deployment type | Enumeration | Indicate whether a carrier of a service container is a virtual machine or a physical machine |
| Type of a timer to be used | Enumeration | Indicate whether the service container uses a high-precision timer or a common-precision timer |

The VIM receives the container creation message, and sends the container creation message to the virtualization layer using the Nf-Vi interface.

In specific implementation, an existing Nf-Vi interface in the NFV system may extend the following fields to describe a timer type of a timer that needs to be used for a service container:

| Field name | Type | Function |
| --- | --- | --- |
| Service container identifier (ID) | universally unique identifier (UUID) | Identify a container |
| Type of a timer to be used | Enumeration | Indicate whether the service container uses a high-precision timer or a common-precision timer |

The container creation message may further include container deployment type description information, and the container deployment type description information is configured to indicate whether a carrier of a service container is a physical machine or a virtual machine.

It may be learned that the NFVO needs to support, in the service deployment descriptor, a description of timer types required for different service containers or a related service feature. Therefore, when parsing a deployment requirement of the service deployment descriptor, the VNFM can properly distinguish between requirements posed by different service containers on timer types, and further complete, during subsequent interaction with the VIM, a function of activating different types of timers in different service containers in order to isolate a negative effect brought by a high-precision timer within a range of a service container and ensure flexible system service deployment.

Step S702. The virtualization layer creates a service container in the NFVI, and deploys the target service in the service container, according to the container creation message.

The multiple target services include various telecommunication services such as a media service, a forwarding service, and a calling service. A specific type of the target service is not limited in this embodiment of the present disclosure.

Step S703. The virtualization layer establishes a binding relationship between the service container and one or more CPUs in the NFVI according to the timer type in the container creation message, where the one or more CPUs each correspond to a timer queue, the timer queue is used to add the timer for the target service, and a timer type in the timer queue is the same as the timer type in the container creation message.

The timer type includes a high-precision timer type and a common-precision timer type. A timer queue corresponding to a CPU in the NFVI includes a high-precision timer queue or a common-precision timer queue. Types of multiple timer queues corresponding to multiple CPUs bound to the service container created by the virtualization layer are the same, and timer types in multiple timer queues are the same as the timer type in the container creation message.

It may be understood that the container creation message received by the virtualization layer may include different timer types that need to be used for the multiple target services, the virtualization layer creates different service containers, and target services using a same timer type are deployed in each service container.

Figure 7B:
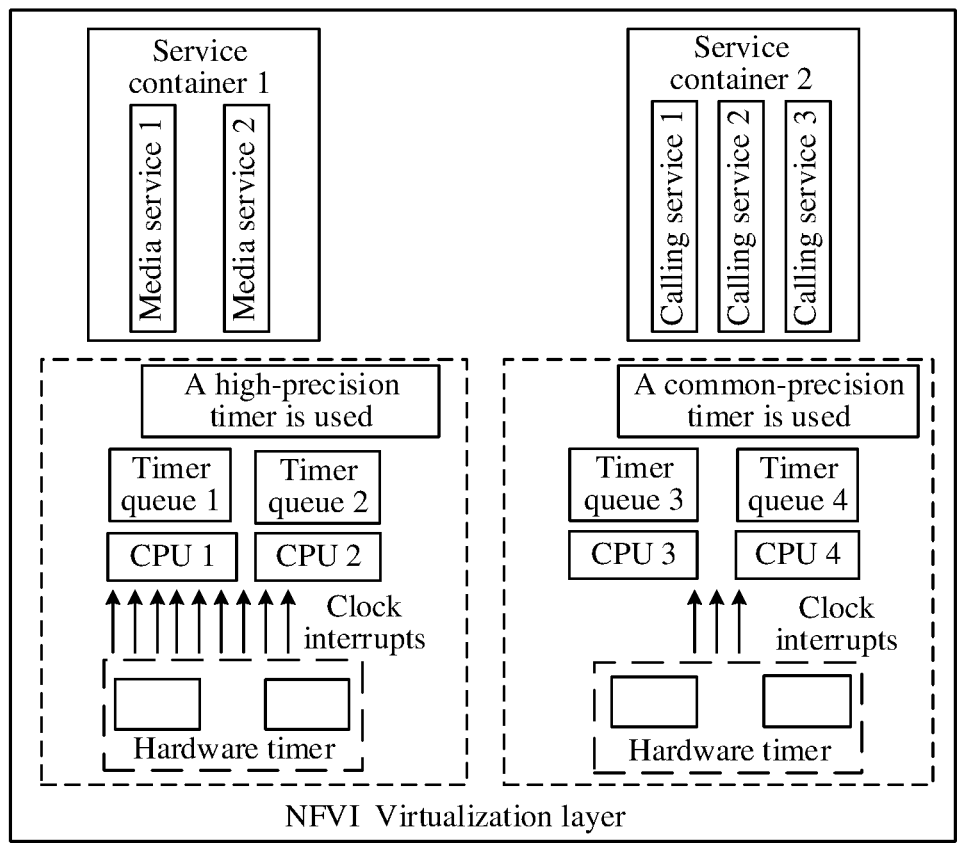
FIG. 7B is an example diagram of establishing a binding relationship between a service container and a CPU according to an embodiment of the present disclosure.

For example, referring to FIG. 7B, it is assumed that a current NFVI includes four CPUs that are respectively a CPU 1, a CPU 2, a CPU 3, and a CPU 4. The CPU 1 corresponds to a timer queue 1, the CPU 2 corresponds to a timer queue 2, the CPU 3 corresponds to a timer queue 3, and the CPU 4 corresponds to a timer queue 4. Types of the timer queue 1 and the timer queue 2 are a high-precision timer type, and types of the timer queue 3 and the timer queue 4 are a common-precision timer type. A target service includes two media services (a media service 1 and a media service 2) and three calling services (a calling service 1, a calling service 2, and a calling service 3). A high-precision timer needs to be used for a media service to meet a delay requirement, and a common-precision timer needs to be used for a calling service to meet a performance requirement. A container creation message received by a virtualization layer includes the following indication information. The two media services require the high-precision timer type, and the three calling services require the common-precision timer type. The virtualization layer creates a service container 1, deploys the two media services in the service container 1, creates a service container 2, deploys the three calling services in the service container 2, and establishes, according to timer types that need to be used for the services in the container creation message, a binding relationship between the service container 1, and the CPU 1 and the CPU 2 (or between the service container 1 and the CPU 1, or between the service container 1 and the CPU 2), and establishes a binding relationship between the service container 2, and the CPU 3 and the CPU 4 (or between the service container 2 and the CPU 3, or between the service container 2 and the CPU 4).

The foregoing service container 1 is bound to the CPU 1 and the CPU 2. Therefore, when a high-precision timer needs to be added during running of the media service 2 deployed in the service container 1, if the media service 2 (for example) is associated with the CPU 1, the virtualization layer adds a high-precision timer into the timer queue 1. Similarly, when a common-precision timer needs to be added during running of a calling service deployed in the service container 2, if the calling service 3 is associated with the CPU 3, the virtualization layer adds the common-precision timer into the timer queue 3. It may be learned that the service container 1 using the high-precision timer and the service container 2 using the common-precision timer use different timer mechanisms on different CPUs, and clock interrupts are isolated from each other such that the service container 1 and the service container 2 that are created by the virtualization layer do not affect a high-precision timer requirement of the media service, and do not increase performance burden of the service container 2 on which the calling service is deployed.

It may be learned that, in this embodiment of the present disclosure, the virtualization layer creates the service container based on the container creation message, deploys the target service in the service container, and establishes a binding relationship between the service container and a CPU resource in the NFV system such that the timer for the target service can be added into a timer queue corresponding to the CPU. Timer queues corresponding to CPUs are isolated from each other, that is, one CPU corresponds to one timer queue. A timer for a service such as a media service that requires a high-precision timer is added into a timer queue of a high-precision timer type, and a timer for a service such as a calling service that requires a common-precision timer is added into a timer queue of a common-precision timer type. Therefore, in this embodiment of the present disclosure, performance impact posed by a service container that requires a high-precision timer in the NFV system can be isolated within a range of a single service container, without affecting performance of a service container that requires only a common-precision timer such that the NFV system considers performance of each service container while ensuring flexible service deployment.

Optionally, in this embodiment of the present disclosure, after establishing a binding relationship between the service container and at least one CPU in the NFVI according to the timer type, the virtualization layer is further configured to perform the following operation of receiving, by the virtualization layer, a timer task request of the target service, and adding the timer for the target service into a timer queue corresponding to a CPU that processes the target service.

It may be learned that the timer for the target service that is added by the foregoing virtualization layer into the timer queue uses a CPU as an isolation granularity in order to isolate a clock interrupt of a CPU corresponding to a high-precision timer queue from a clock interrupt of a CPU corresponding to a common-precision timer queue. A created service container is bound to a CPU, that is, different service containers are bound to different CPUs. Therefore, clock interrupts of service containers are isolated from each other such that the NFV system considers performance of each service container while ensuring flexible service deployment.

Optionally, in this embodiment of the present disclosure, before the virtualization layer in the NFVI receives the container creation message sent by the VIM for the target service, the virtualization layer is further configured to create, using a preset timer enabling component in the virtualization layer, a high-precision timer queue corresponding to a CPU that uses a high-precision timer, and a common-precision timer queue corresponding to a CPU that uses a common-precision timer.

It may be learned that the virtualization layer creates both the high-precision timer queue and the common-precision timer queue using the preset timer enabling component, establishes in advance an association relationship between a CPU resource and a timer queue in the NFV system. Therefore, when dynamically creating a service container based on a service requirement, the virtualization layer can allocate, to the created service container in real time, a CPU resource to which the created service container needs to be bound in order to help improve realtimeness in service container deployment.

Optionally, in this embodiment of the present disclosure, the container creation message may further include a CPU resource use mode. The CPU resource use mode is used to indicate a CPU resource use mode of a service container, and further includes two modes, exclusive occupation of a CPU resource and sharing of a CPU resource.

In specific implementation, an existing Vi-Vnfm interface in the NFV system may extend a CPU resource use mode field to describe a CPU resource use mode of a service container.

| Field name | Type | Function |
| --- | --- | --- |
| Deployment type | Enumeration | Indicate whether a carrier of a service container is a virtual machine or a physical machine |
| Type of a timer to be used | Enumeration | Indicate whether the service container uses a high-precision timer or a common-precision timer |
| CPU resource use mode | Enumeration | Indicate whether the service container exclusively occupies a CPU resource or shares a CPU resource with another service container |

Accordingly, an existing Nf-Vi interface in the NFV system may extend a CPU resource use mode field to describe a CPU resource use mode of a service container.

| Field name | Type | Function |
| --- | --- | --- |
| Service container ID | UUID | Identify a container |
| Type of a timer to be used | Enumeration | Indicate whether the service container uses a high-precision timer or a common-precision timer |
| CPU resource use mode | Enumeration | Indicate whether the service container exclusively occupies a CPU or shares a CPU resource with another service container |

If the CPU resource use mode in the container creation message is exclusive occupation of a CPU resource, a CPU to which the service container created by the virtualization layer is bound can be occupied only by the service container, that is, only a timer for the target service in the service container can be added into a timer queue corresponding to the bound CPU, and a timer for a service in another service container except the service container cannot be added into the timer queue corresponding to the bound CPU.

For example, the schematic diagram of CPU resource allocation shown in FIG. 7B is still used as an example. If CPUs in the current NFVI that use a high-precision timer further include a CPU 5, the CPU 5 is bound to a service container 3 recently created by the virtualization layer, and a forwarding service is deployed in the service container 3, when the CPU resource use mode in the container creation message is exclusive occupation of a CPU resource, a timer for the forwarding service in the service container 3 can be added only into a timer queue 5 corresponding to the CPU 5, and cannot be added into the timer queue 1 corresponding to the CPU 1 or the timer queue 2 corresponding to the CPU 2. Similarly, a timer for a target service in the service container 1 cannot be added into the timer queue 5 either.

If the CPU resource use mode in the container creation message is sharing of a CPU resource, multiple service containers of a same type that are created by the virtualization layer can share a corresponding CPU, that is, timers for services in the multiple service containers of the same type can be added into a timer queue corresponding to one CPU. This may further avoid a waste occurring when a CPU resource bound to a service container with less traffic is deployed in the mode of exclusive occupation of a CPU resource, and helps use a CPU resource more properly.

For example, the schematic diagram of CPU resource allocation shown in FIG. 7B is still used as an example. If CPUs in the current NFVI that use a high-precision timer further include a CPU 5, the CPU 5 is bound to a service container 3 recently created by the virtualization layer, and a forwarding service is deployed in the service container 3, when the CPU resource use mode in the container creation message is exclusive occupation of a CPU resource, if both the media service 1 and the media service 2 in the service container 1 are associated with the CPU 2, a resource of the CPU 1 is not actually used by the service container 1, and in this mode, another service container of a same type cannot share the CPU 1. However, when the CPU resource use mode in the container creation message is sharing of a CPU resource, if there are multiple forwarding services in a service container 3, when a timer queue 3 corresponding to one CPU 3 cannot meet a requirement for adding timers for multiple forwarding services, the virtualization layer may add a timer for some forwarding services in the service container 3 into a timer queue 1 corresponding to the CPU 1. In this way, CPU resources of a same timer type can be used more properly.

Optionally, in this embodiment of the present disclosure, the CPU resource use mode in the container creation message is sharing of a CPU resource, the NFVI includes a first CPU group including CPUs that use a high-precision timer and a second CPU group including CPUs that use a common-precision timer, and after establishing the binding relationship between the service container and the one or more central processing units CPUs in the NFVI, the virtualization layer is further configured to perform the following operation of adjusting, by the virtualization layer, a timer type used by at least one CPU in a CPU group with less CPU usage of the first CPU group and the second CPU group if the virtualization layer detects that a difference between first CPU usage of the first CPU group and second CPU usage of the second CPU group is greater than or equal to a preset threshold.

Figure 7C:
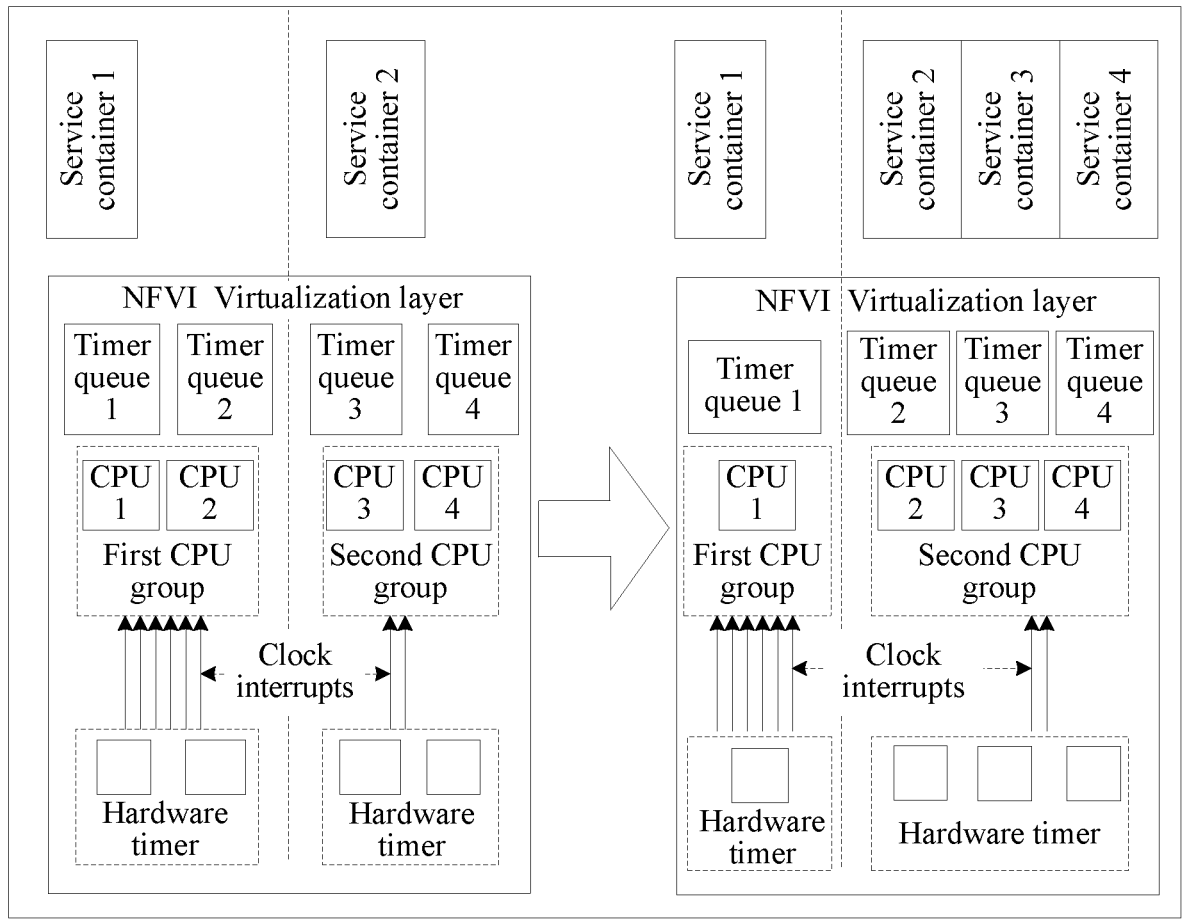
FIG. 7C is an example diagram of adjusting a CPU resource in a CPU resource sharing mode according to an embodiment of the present disclosure.

For example, referring to FIG. 7C, a CPU resource of the virtualization layer in the current NFV system includes a CPU 1, a CPU 2, a CPU 3, and a CPU 4. The CPU 1 and the CPU 2 use a high-precision timer, the CPU 3 and the CPU 4 use a common-precision timer, the CPU 1 and the CPU 2 form a first CPU group, and the CPU 3 and the CPU 4 form a second CPU group. A service container 1 of a high-precision type and a service container 2 of a common-precision type are created in a current system, CPU usage of the first CPU group is 60%, CPU usage of the second CPU group is 65%, and a preset threshold is 20%. If service containers (a service container 3 and a service container 4) of a common-precision type increase due to a service deployment requirement, and the CPU usage of the second CPU group abruptly increased from 65% to 95%, when the virtualization layer detects that a difference 35% between the CPU usage 60% of the first CPU group and the CPU usage 95% of the second CPU group is greater than the preset threshold 20%, the virtualization layer adjusts the timer used by the CPU 2 in the first CPU group into a common-precision timer. Therefore, the CPU usage of the first CPU group and that of the second CPU group upon adjustment are comparative balanced.

It may be learned that the virtualization layer in this embodiment of the present disclosure can flexibly adjust a CPU resource based on an actual deployment status of a service container in order to help improve CPU resource usage of the NFV system.

Figure 8:
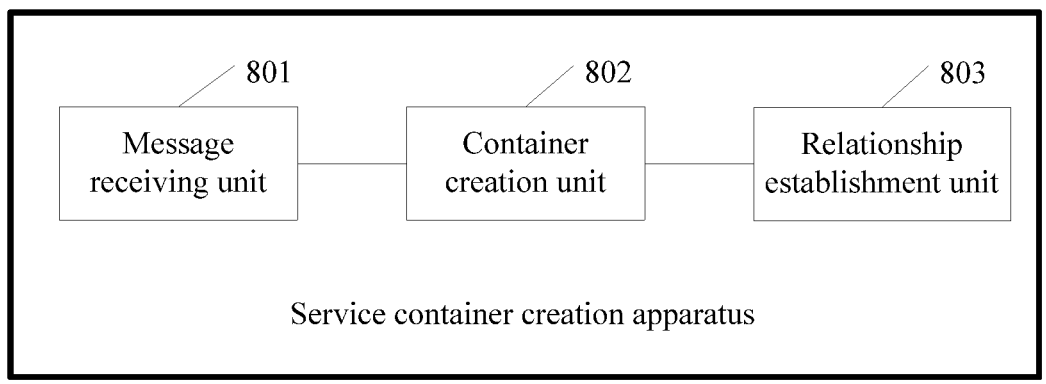
FIG. 8 is a schematic structural diagram of a service container creation apparatus according to an embodiment of the present disclosure.

Referring to FIG. 8, FIG. 8 is a schematic structural diagram of a service container creation apparatus according to an apparatus embodiment of the present disclosure. As shown in the figure, the apparatus includes a message receiving unit 801, a container creation unit 802, and a relationship establishment unit 803.

The message receiving unit 801 is configured to receive a container creation message sent by a VIM for a target service, where the container creation message includes a timer type of a timer that needs to be used for the target service.

The container creation unit 802 is configured to create a target service container in an NFVI, and deploy the target service in the service container, according to the container creation message.

The relationship establishment unit 803 is configured to establish a binding relationship between the service container and one or more CPUs in the NFVI according to the timer type in the container creation message, where the one or more CPUs each correspond to a timer queue, the timer queue is used to add the timer for the target service, and a timer type in the timer queue matches or is the same as the timer type in the container creation message.

Optionally, the container creation message received by the virtualization layer includes different timer types that need to be used for multiple target services, the virtualization layer creates different service containers, and target services using a same timer type are deployed in each service container.

Optionally, the multiple target services include a media service and a forwarding service.

Optionally, the apparatus further includes an addition unit (not shown) configured to receive a timer task request of the target service, and add the timer for the target service into a timer queue corresponding to a CPU that processes the target service.

Optionally, the container creation message is generated when an NFVM parses a service deployment descriptor and is sent to the VIM after an NFVO of an NFVMANO generates the service deployment descriptor based on obtained requirement information of the target service and sends the service deployment descriptor to the NFVM.

Optionally, the apparatus further includes a queue creation unit (not shown) configured to before the message receiving unit 801 receives the container creation message sent by the VIM for the target service, create, using a preset timer enabling component, a high-precision timer queue corresponding to a CPU that uses a high-precision timer, and a common-precision timer queue corresponding to a CPU that uses a common-precision timer.

It should be noted that the service container creation apparatus described in this apparatus embodiment of the present disclosure is presented in a form of a functional unit. The term "unit" used herein should be understood in the widest possible sense, and an object configured to implement functions described for each "unit" may be an application specific integrated circuit (ASIC), a single circuit, a (shared, dedicated, or chipset) processor and a memory configured to execute one or more software or firmware programs, a combined logic circuit, and/or another appropriate component that implements the foregoing functions.

For example, a person skilled in the art may consider that the service container creation apparatus may be further the virtualization layer in the NFV system shown in FIG. 6.

It may be learned that, in this embodiment of the present disclosure, the service container deployment apparatus creates the service container based on the container creation message, deploys the target service in the service container, and establishes a binding relationship between the service container and a CPU resource in the NFV system such that the timer for the target service can be added into the timer queue corresponding to the CPU. Timer queues corresponding to CPUs are isolated from each other, that is, one CPU corresponds to one timer queue. A timer for a service such as a media service that requires a high-precision timer is added into a timer queue of a high-precision timer type, and a timer for a service such as a calling service that requires a common-precision timer is added into a timer queue of a common-precision timer type. Therefore, in this embodiment of the present disclosure, performance impact posed by a service container that requires a high-precision timer in the NFV system can be isolated within a range of a single service container, without affecting performance of a service container that requires only a common-precision timer such that the NFV system considers performance of each service container while ensuring flexible service deployment.

Figure 9:
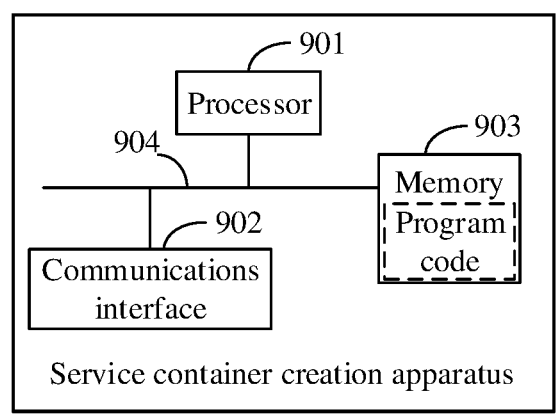
FIG. 9 is a schematic structural diagram of another service container creation apparatus according to an embodiment of the present disclosure.

Referring to FIG. 9, FIG. 9 is a schematic structural diagram of another service container creation apparatus according to an embodiment of the present disclosure. The service container creation apparatus described in this embodiment is applied to the NFV system shown in FIG. 6, and includes a processor 901, a communications interface 902, and a memory 903. The processor 901, the communications interface 902, and the memory 903 are connected using a bus 904.

The processor 901 may be the computing hardware 112 in the NFV system shown in FIG. 6, and further includes a general-purpose CPU, a microprocessor, an ASIC, or one or more integrated circuits configured to control execution of programs in the foregoing solutions.

The communications interface 902 may be an Nf-Vi interface between a virtualization layer and a VIM in an NFV standard, for example, Ethernet, a radio access network (RAN), or a wireless local area network (WLAN).

The memory 903 may be the storage hardware 114 in the NFV system shown in FIG. 6, and further includes a read-only memory (ROM) or a static storage device of another type that can store static information and an instruction, and a random access memory (RAM) or a dynamic storage device of another type that can store information and an instruction, or may be an electrically erasable programmable ROM (EEPROM), a compact disc ROM (CD-ROM) or another compact disk storage, an optical disc storage (including a compressed optical disc, a laser disc, an optical disc, a universal digital disc, BLU-RAY DISC, and the like), a magnetic disk storage medium or another magnetic storage device, or any other medium that can be configured to carry or store desired program code in a form of an instruction or a data structure and can be accessed by a computer. However, this does not constitute a limitation. The memory may independently exist, or may be integrated with the processor 901.

Code stored in the memory 903 may perform the service container creation method that is performed by the virtualization layer and provided above, for example, creating a service container in an NFVI, and deploying a target service in the service container, according to a container creation message, and establishing a binding relationship between the service container and one or more central processing units CPUs in the NFVI according to a timer type in the container creation message.

An embodiment of the present disclosure further provides a computer storage medium. The computer storage medium may store a program, and when the program is executed, some or all of the steps of any service container creation method recorded in the foregoing method embodiment are included.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to the other approaches, or all or a part of the technical solutions may be implemented in the form of a software product. The software product is stored in a storage and includes several instructions for instructing a computer device (which may be a personal computer, a server, or a network device) to perform all or a part of the steps of the methods described in the embodiments of the present disclosure. The foregoing storage includes any medium that can store program code, such as a universal serial bus (USB) flash drive, a ROM, a RAM, a removable hard disk, a magnetic disk, or an optical disc.

The remote radio units provided in the embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A service container creation method comprising:
receiving, by a virtualization layer in a network functions virtualization infrastructure (NFVI), a container creation message from a virtualized infrastructure manager (VIM) for a target service, wherein the container creation message comprises a timer type of a timer for the target service;
creating, by the virtualization layer, a service container in the NFVI;
deploying, by the virtualization layer, the target service in the service container according to the container creation message; and
establishing, by the virtualization layer, a binding relationship between the service container and one or more central processing units (CPUs) in the NFVI according to the timer type in the container creation message, wherein the one or more CPUs correspond to a timer queue, and wherein the timer for the target service is added to the timer queue corresponding to the timer type in the container creation message.

2. The method of claim 1, wherein the container creation message comprises a plurality of timer types for a plurality of target services, and wherein the method further comprises creating, by the virtualization layer, a plurality of service containers corresponding to the plurality of target services, wherein each of the plurality of service containers correspond to one of the plurality on timer types.

3. The method of claim 2, wherein the plurality of target services comprises a media service and a forwarding service.

4. The method of claim 1, wherein the timer type comprises one of a high-precision timer type or a common-precision timer type.

5. The method of claim 1, further comprising:
receiving, by the virtualization layer, a timer task request of the target service; and
adding, by the virtualization layer, the timer for the target service into a timer queue corresponding to a CPU processing the target service.

6. The method of claim 1, wherein the container creation message is generated when a network functions virtualization manager (NFVM) parses a service deployment descriptor and is sent to the VIM after a network functions virtualization orchestrator (NFVO) of a network functions virtualization orchestration and management system (NFVMANO) generates the service deployment descriptor based on obtained requirement information of the target service and sends the service deployment descriptor to the NFVM.

7. The method of claim 1, wherein before receiving the container creation message from the VIM for the target service, the method further comprises creating, by the virtualization layer using a preset timer enabling component, a high-precision timer queue corresponding to a CPU that uses a high-precision timer and a common-precision timer queue corresponding to a CPU that uses a common-precision timer.

8. An apparatus in a network functions virtualization infrastructure (NFVI), wherein the apparatus comprises:
a transceiver;
a non-transitory computer-readable memory coupled to the transceiver and configured to store a program; and
one or more processors coupled to the non-transitory computer-readable memory, wherein the program, when executed, causes the one or more processors to:
receive, using the transceiver, a container creation message from a virtualized infrastructure manager (VIM) for a target service, wherein the container creation message comprises a timer type of a timer for the target service;
create a service container in the NFVI;
deploy the target service in the service container according to the container creation message; and
establish a binding relationship between the service container and one or more central processing units (CPUs) in the NFVI according to the timer type in the container creation message, wherein the one or more CPUs correspond to a timer queue, and wherein the timer for the target service is added to the timer queue corresponding to the timer type the container creation message.

9. The apparatus of claim 8, wherein the container creation message comprises a plurality of timer types for a plurality of target services, and wherein the program further causes the one or more processors create a plurality of service containers corresponding to the plurality of target services, wherein each of the plurality of service containers corresponds to one of the plurality of timer types.

10. The apparatus of claim 9, wherein the plurality of target services comprises a media service and a forwarding service.

11. The apparatus of claim 8, wherein the timer type comprises one of a high-precision timer type or a common-precision timer type.

12. The apparatus of claim 8, wherein the program further causes the one or more processors to:
receive a timer task request of the target service; and
add the timer for the target service into a timer queue corresponding to a CPU processing the target service.

13. The apparatus of claim 8, wherein the container creation message is generated when a network functions virtualization manager (NFVM) parses a service deployment descriptor and is sent to the VIM after a network functions virtualization orchestrator (NFVO) of a network functions virtualization orchestration and management system (NFVMANO) generates the service deployment descriptor based on obtained requirement information of the target service and sends the service deployment descriptor to the NFVM.

14. The apparatus of claim 8, wherein before receiving the container creation message from the VIM for the target service, the program further causes the one or more processors to create using a preset timer enabling component, a high-precision timer queue corresponding to a CPU that uses a high-precision timer and a common-precision timer queue corresponding to a CPU that uses a common-precision timer.

15. A system in a network functions virtualization infrastructure (NFVI), wherein the system comprises a network functions virtualization manager (NFVM), a network functions virtualization orchestrator (NFVO), and an apparatus, wherein the apparatus comprises:
a memory; and
one or more processors coupled to the memory, wherein the one or more processors is configured to:
receive, from a virtualized infrastructure manager (VIM) for a target service, a container creation message comprising a timer type of a timer for the target service;
create a service container in the NFVI;
deploy the target service in the service container; and
establish a binding relationship between the service container and one or more central processing units (CPUs) in the NFVI according to the timer type in the container creation message, wherein the one or more CPUs correspond to a timer queue, and wherein the timer for the target service is added to the timer queue.

16. The system of claim 15, wherein the NFVM is configured to:
parse a service deployment descriptor;
generate the container creation message; and
send the container creation message to the VIM.

17. The system of claim 16, wherein the NFVO is configured to:
generate the service deployment descriptor based on obtained requirement information of the target service; and
send the service deployment descriptor to the NFVM.

18. The system of claim 15, wherein the target service comprises one of a media service or a forwarding service.

19. The system of claim 15, wherein the timer type comprises one of a high-precision timer type or a common-precision timer type.

20. The system of claim 15, wherein the one or more processors is further configured to create, using a preset timer enabling component, a high-precision timer queue corresponding to a CPU that uses a high-precision timer and a common-precision timer queue corresponding to a CPU that uses a common-precision timer.

* * * * *